(12) United States Patent
Lowry et al.

(10) Patent No.: US 6,409,443 B1
(45) Date of Patent: *Jun. 25, 2002

(54) SPRING FASTENER WITH Y-SHAPED CUT AS FUNNEL

(75) Inventors: Joseph William Lowry, Libertyville; Michael Anthony Giugliano, Des Plaines; Michael Walter Smith, Lake Zurich, all of IL (US); Eustathios Vassiliou, Newark, DE (US)

(73) Assignee: WTPA, Incorporated, Newark, DE (US)

( * ) Notice: Subject to any disclaimer, the term of this patent is extended or adjusted under 35 U.S.C. 154(b) by 59 days.

This patent is subject to a terminal disclaimer.

(21) Appl. No.: 09/699,758

(22) Filed: Oct. 30, 2000

Related U.S. Application Data
(60) Provisional application No. 60/234,385, filed on Sep. 20, 2000.

(51) Int. Cl.[7] ............................ F16B 13/06; F16B 37/04
(52) U.S. Cl. ...................... 411/55; 411/60.2; 411/183; 411/258
(58) Field of Search .......................... 411/30, 55, 60.1, 411/60.2, 61, 182, 183, 258, 542

(56) References Cited

U.S. PATENT DOCUMENTS

| | | | |
|---|---|---|---|
| 4,500,238 A | 2/1985 | Vassiliou | 411/30 |
| 4,765,788 A | 8/1988 | Nowak et al. | 411/61 |
| 4,874,277 A | 10/1989 | Nowak et al. | 411/61 |
| 4,941,340 A | 7/1990 | Nowak et al. | 72/379.2 |
| 5,100,273 A | 3/1992 | Vassiliou | 411/60 |
| 5,429,467 A * | 7/1995 | Gugle et al. | 411/182 |
| 5,447,005 A | 9/1995 | Giannuzzi | 411/30 |
| 5,725,343 A | 3/1998 | Smith | 411/55 |
| 6,095,734 A * | 8/2000 | Postadan et al. | 411/182 |
| 6,280,129 B1 * | 8/2001 | Lowry et al. | 411/182 X |

* cited by examiner

Primary Examiner—Neill Wilson
(74) Attorney, Agent, or Firm—E. Vassiliou

(57) ABSTRACT

This invention relates to a fastener, which expands by the insertion of an expanding member, preferably a screw. The fastener comprises a substantially flat head and two expandable legs. The head has an upper side and a lower side, preferably separated by a gap. The head also has a hole (round, oblong or otherwise shaped) in which the expanding body may engage or pass through for expanding the legs and securing one object to another object, such as a plastic panel to a metal sheet. The fastener also comprises a Y-shaped funnel configuration, which has been formed by a partial cut of the legs. Miscellaneous configurations of the Y shaped legs provide improved guidance to the expanding member, improved engagement to at least one of the objects, such as the metal sheet for example, and improved engagement to the expanding member, among other advantages. The fastener may also comprise portions under the upper side of the head, which portions are engageable to the expanding member. Further, the fastener of the present invention may comprise an elastic body at least under the head. This invention also relates to vehicles comprising parts connected by the fasteners of this invention.

68 Claims, 4 Drawing Sheets

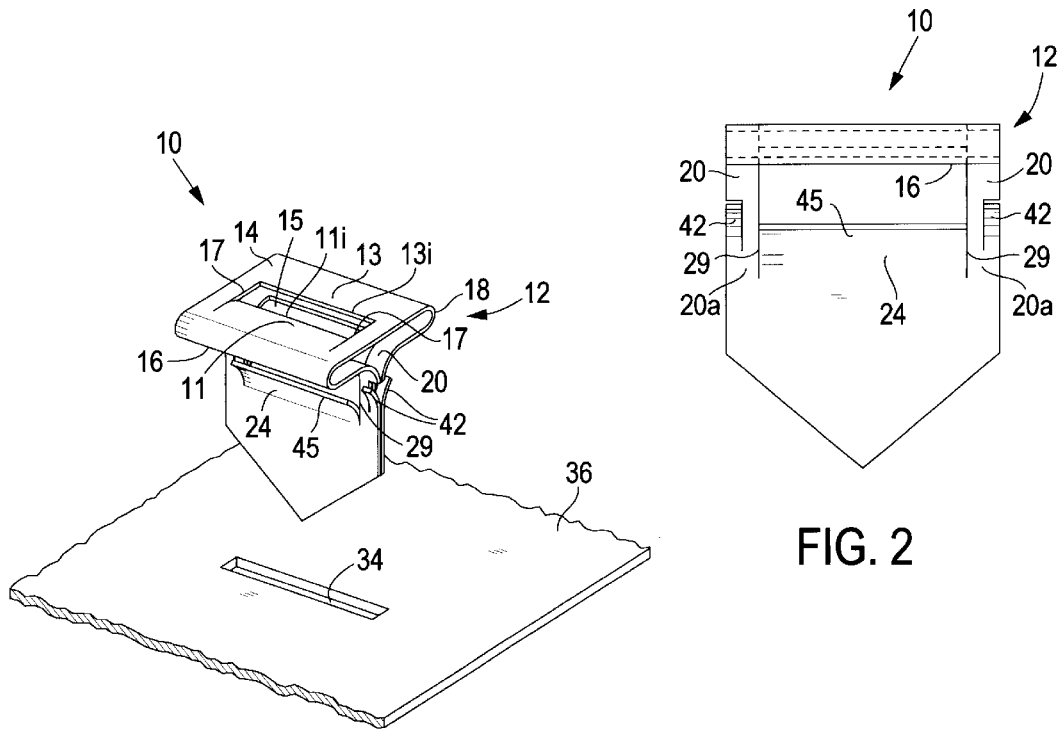
FIG. 1
FIG. 2
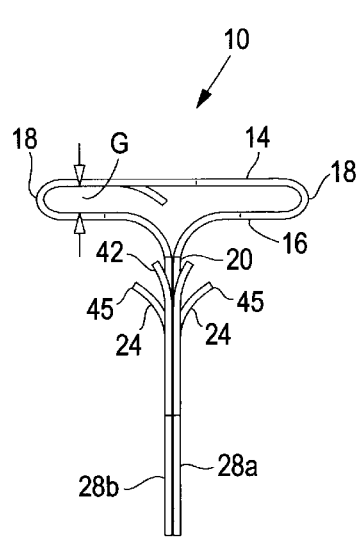
FIG. 3
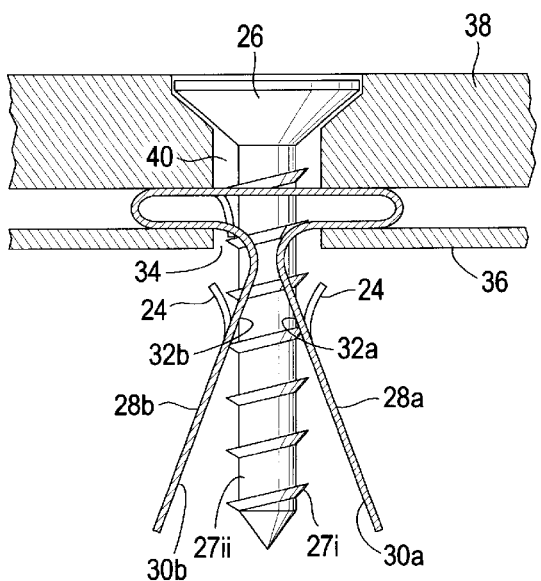
FIG. 4

SPRING FASTENER WITH Y-SHAPED CUT AS FUNNEL

RELATED APPLICATIONS

This application claims priority of provisional patent application No. 60/234,385, filed on Sep. 20, 2000, which is incorporated herein by reference in its entirety.

FIELD OF THE INVENTION

This invention pertains fasteners, and more particularly fasteners which have expandable legs and which attach one object to another object.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Recently, fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. The second part of the fastener, being usually a bolt or a screw, supports the second object by forcing the legs of the fastener (as described for example in U.S. Pat. No. 4,500,238) to open or expand, thereby securing the two objects together. The fasteners of this type have greatly improved the prevailing torque (torque required to render a screw loose), as well as the pulling force (pulling force applied on a screw to the point of failure) of the system.

The fasteners of the type described in U.S. Pat. No. 4,500,238 have a funnel portion into which an expanding is driven for expanding the legs of the fastener. This funnel has a bucket-like shape which has been impressed on the legs during the manufacture of the fastener. This impression derived funnel is rather inflexible and in some occasions has a tendency to drive the expanding member in undesired direction. A good example of such an occasion is the case of the fasteners described in provisional patent application No. 60/171,544, filed on Dec. 22, 1999 and patent application No. 09/611,134, filed Jul. 6, 2000, both of which are incorporated herein by reference. In both cases, one major object of these inventions is to provide fasteners which are easy to install even in awkward and difficult to reach positions. However, the expanding member, when inserted, is sometimes misaligned after reaching the bucket-like funnel, a situation which is corrected by the funnel configuration of this invention.

Further, the present invention may eliminate, if so desired, barbs which are used to support the fastener in one of parts to be connected together by said fastener.

In addition, the funnel configuration of the instant invention may be used to provide engagement under the head of the fastener, a very desirable attribute in a plurality of occasions.

A large number of other advantages are also derived from the critical configuration of the funnel of the present invention.

SUMMARY OF THE INVENTION

In the following text, the following comments and definitions are appropriate:

The expanding member is preferably a screw having threads and a root on which the threads are supported.

Engageable hole or region is an at least partial hole or region which can be engaged with a screw, or similar element.

At least partial hole may be a part of a hole, such as an arc for example. However, the hole does not have to be round.

Curved portion is defined as a portion having a non-linear configuration, even if it comprises smaller non-aligned linear sections, such as saw tooth for example.

Pitch of a screw is defined as the distance between two consecutive threads of the screw.

This invention pertains spring fasteners comprising:

(a) a substantially flat head portion having an upper side, and a lower side, the upper side having a hole through which an expanding member can pass;

(b) a neck having an opening and two side neck portions, the neck extending from the lower side of the substantially flat head portion at a substantially right angle with respect to the substantially flat head portion;

(c) two substantially flat legs extending from the neck, each leg having an inner surface, the two inner surfaces of the two legs being at an initial proximity with each other, the legs being expandable in opposite directions upon inserting through and engaging to the first oblong engageable hole an expanding member, thus bringing the expanding member to a contact region of the legs; and (d) a Y-shaped funnel in the vicinity of the contact region, the Y-shaped funnel comprising partially cut leg portions extending outwardly from the legs.

The hole may be substantially round having a diameter, and the funnel may preferably have a first width longer than the diameter of the hole. The hole is preferably but not necessarily engageable to the expanding member. The hole may also comprise an oblong opening having a second width, the second width being preferably at least as long as the first width.

The oblong hole may have a first side and a second side opposite the first side, the first side being disposed at a first plane and the second side disposed at a second plane different than the first plane, the first side having a first edge and the second side having a second edge. Preferably, the expanding member has threads, a root, and a pitch, and the first edge and the second edge are separated by a distance corresponding to the pitch of the expanding member.

The first edge and/or the second edge may be linear and/or curved.

A portion of the fastener under the upper side of the head may comprise an engageable element to the expanding member.

The fastener may comprise an elastic body molded at least at the lower side of the head of the fastener.

The Y-shaped funnel may comprise an inwardly bent upper portion. Further, the Y-shaped funnel may be adequately long so as to engage under a specified panel, through a slot of which panel the spring fastener has been inserted and the legs of said fastener have been expanded by the expanding member.

Also, the Y-shaped funnel may comprise an inwardly bent upper portion, and said Y-shaped funnel may be adequately long to engage under a specified panel, through a slot of which panel the spring fastener has been inserted and the legs of said fastener have been expanded by the expanding member.

As aforementioned, the portion of the fastener, at least under the upper side of the head, may comprise an element engageable to the expanding member. Such engageable elements are achieved by the present invention, and are also described in provisional applications No. 60/167,080 (Vassiliou), filed Nov. 23, 1999, No. 60/169,477 (Vassiliou), filed Dec. 7, 1999, No. 60/170,611, filed on Dec. 14, 1999, and No. 60/179,834, filed Feb. 2, 2000, all four of which provisional applications are incorporated herein by reference.

As also aforementioned, When water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. No. 5,725,343 (Smith), in the provisional application of Kanubhai Manibhai Patel, Michael Walter Smith and Edward John Smith, titled "High Performance Sealing Fastener", having a Serial No. 60,170, 112, and filed on Dec. 10, 1999, which provisional application is incorporated herein by reference, and U.S. patent application Ser. No. 09/561,505, filed Apr. 28, 2000, which is also incorporated herein by reference.

The present invention also pertains vehicles comprising parts connected with the above described spring fasteners.

BRIEF DESCRIPTION OF THE DRAWING

The reader's understanding of this invention will be enhanced by reference to the following detailed description taken in combination with the drawing figures, wherein:

FIG. 1 is a perspective view of a fastener, according to a preferred embodiment of this invention, and a panel with a slot, on which panel the fastener is intended to fasten another object.

FIG. 3 is a view of the fastener illustrated in FIG. 1.

FIG. 4 is a cross-sectional side view of the fastener illustrated in FIG. 1 connecting two objects or panels after the legs of the fastener have been expanded by a screw.

DETAILED DESCRIPTION OF THE INVENTION

As already mentioned, the fasteners of the type described in U.S. Pat. No. 4,500,238 have a funnel portion into which an expanding is driven for expanding the legs of the fastener. This funnel has a bucket-like shape which has been impressed on the legs during the manufacture of the fastener. This impression derived funnel is rather inflexible and in some occasions has a tendency to drive the expanding member in undesired direction. A good example of such an occasion is the case of the fasteners described in provisional patent application No. 60/171,544, filed on Dec. 22, 1999 and patent application Ser. No. 09/611,134, filed Jul. 6, 2000, both of which are incorporated herein by reference. In both cases, one major object of these inventions is to provide fasteners which are easy to install even in awkward and difficult to reach positions. However, the expanding member, when inserted, is sometimes misaligned after reaching the bucket-like funnel, a situation which is corrected by the funnel configuration of this invention.

Further, the present invention may eliminate, if so desired, barbs which are used to support the fastener in one of parts to be connected together by said fastener.

In addition, the funnel configuration of the instant invention may be used to provide engagement under the head of the fastener, a very desirable attribute in a plurality of occasions.

A large number of other advantages are also derived from the critical configuration of the funnel of the present invention.

Figure 1A:
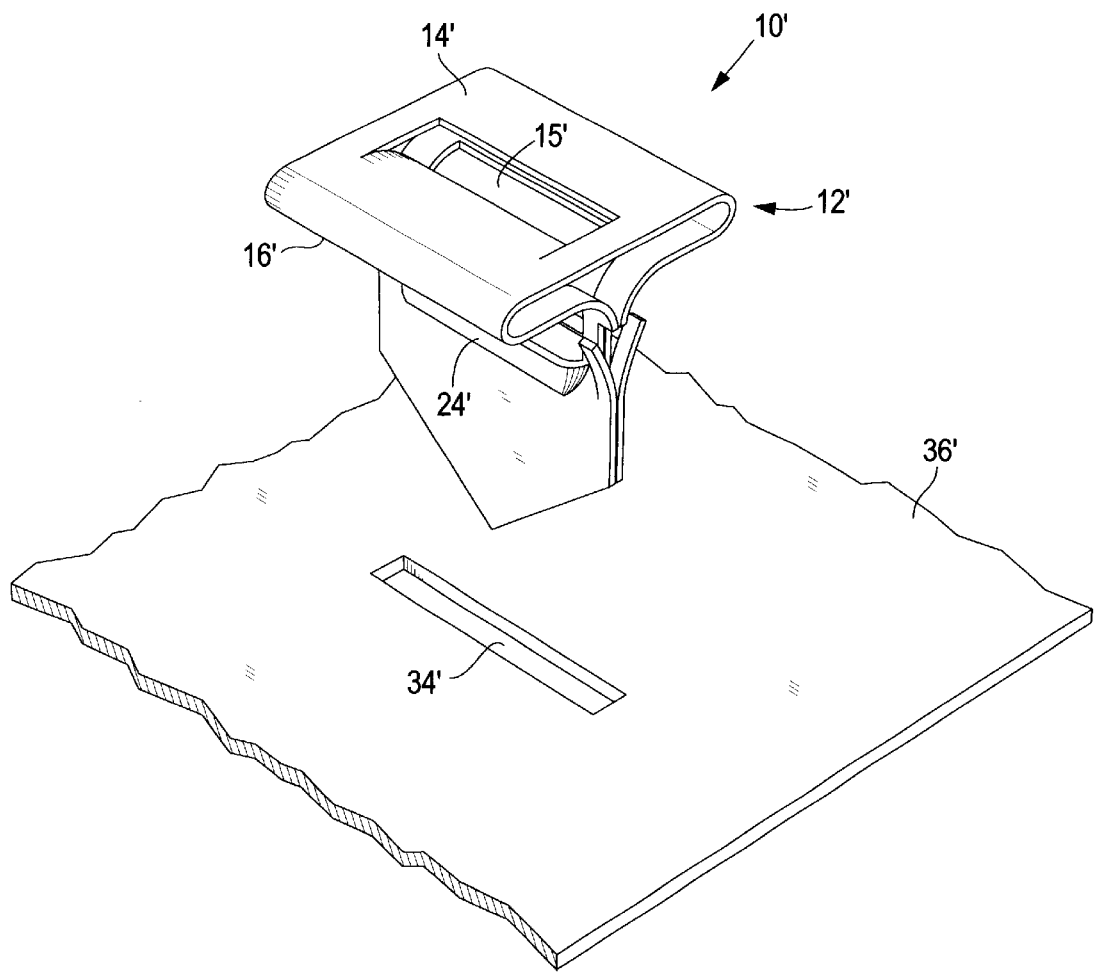
FIG. 1A is a perspective view of a fastener as described in provisional patent application No. 60/171,544, filed on Dec. 22, 1999 and patent application Ser. No. 09/611,134, filed Jul. 6, 2000, and a panel with a slot, on which panel the fastener is intended to fasten another object.

Referring now to FIG. 1A, there is depicted a fastener 10' according to the disclosure of provisional patent application Ser. No. 60/171,544, filed on Dec. 22, 1999 and patent application Ser. No. 09/611,134, filed Jul. 6, 2000.

In FIGS. 1–4 there is depicted a fastener 10 according to a preferred embodiment of this invention. The basic difference between fastener 10' and fastener 10 is in the configuration of the funnel 24' as compared to the configuration of funnel 24, respectively, as it will be explained in detail hereinbelow.

As shown in FIGS. 1–4, the fastener 10, comprises a substantially flat head portion 12. The substantially flat head portion 12 has an upper side 14, and a lower side 16.

The upper side 14 has a first oblong hole 15, which is engageable to an expanding member 26 (better shown in FIG. 4). The first oblong hole 15 has a first side 11, which in turn has a first edge 11i, and a second side 13, which has in turn a second edge 13i. The two sides 11 and 13 are on different planes, as well shown in FIG. 2. The plane on which the second side 13 resides is the same plane as the plane on which the upper side 14 of the head 12 resides. The plane on which the first side 11 resides is a plane having an inclination with respect to the plane of the second side 13. The edges 11i and 13i are linear in this particular embodiment. The side 11 has been made by cutting side slits 17 and bending the portion of the upper side 14, which portion corresponds to the side 11. Although the side slits 17 are desirable, they are not absolutely necessary, and the bent of the first side 11 can be realized in the absence of such side slits. The slits may also be extended toward the side 13, if so desired.

One or both edges 11i and 13i of the oblong hole 15 may also be curved as described in provisional patent application No. 60/171,544, filed on Dec. 22, 1999 and patent application Ser. No. 09/611,134, filed Jul. 6, 2000.

The position and distance between the two edges 11i and 13i are such that they correspond to the pitch of the expanding member 26 (FIG. 4) in a manner that the expanding member becomes engageable to the oblong hole 15.

The upper side 14 and the lower side 16 may be separated by a gap G as better shown in FIG. 3, or they may be substantially in contact (not shown for purposes of clarity) with each other, depending on the application. The upper side 14 is connected to the lower side 16 through a bents 18.

The larger the gap G the larger the radius of the bents 18, and therefore, the higher the pulling force which is needed to break the hardened fastener at the bent regions. However, there are occasions when a small gap or absence of a gap is necessary usually due to space requirements.

The fastener 10 further comprises a neck 20 having a cutting or opening 22 and two side neck portions 20a. The neck 20 extends from the lower side 16 of the substantially flat head portion 12 at a substantially right angle in its length with respect to the substantially flat head portion 12 of the fastener 10.

The fastener 10 also comprises two substantially flat legs, a right leg 28a and a left leg 28b, extending from the neck 20, and having inner surfaces 30a and 30b, respectively, the two inner surfaces 30a and 30b of the two legs 28a and 28b being at an initial proximity with each other, the legs being expandable in opposite directions upon inserting through and engaging to the first engageable hole the expanding member, such as screw 26 having threads 27i and a root 27ii, and a pitch, thus bringing the expanding member to a contact region 32a on leg 28a and a contact region 32b on leg 28b (collectively contact regions 32 and legs 28, respectively).

At the bottom of the opening 22 there is disposed an oblong funnel 24 for guiding the expanding member 26, such as a screw 26 (see FIG. 4), for example. The oblong funnel 24 has been made by forming funnel slits 29, and at least partially bending the portion of legs 28 between the slits 29 in a manner to form the Y-shaped funnel 24, having an upper portion 45.

The opening 22 may have any appropriate dimensions. For example, it may have a general open shape as shown in FIG. 2, or it may be elongated, or it may be just a thin slit parallel to the plane of and adjacent to the substantially flat head portion 12. In the case that it is just a thin slit adjacent to the substantially flat head portion 12, the funnel 24 will also be adjacent to the substantially flat head portion 12, and the two side neck portions 20a will be minuscule in length from the lower side 16 to the beginning of the legs in the vicinity of the funnel 24.

In operation, the fastener 10 is inserted through slot 34 of a sheet, preferably metal sheet 36. In sequence, a panel 38 is placed on top having a panel hole 40. The expanding body, preferably screw 26, is then inserted through the panel hole 40, engages to the first oblong engageable hole 15 of the fastener, and expands the legs 28a and 28b by applying force at the contact region 32a and 32b.

Especially in cases that the connection of the two parts is positioned in difficult to reach positions, the operator is considerably helped in locating the first engageable hole 15, since this hole is oblong, and therefore, the expanding member can be inserted in a plurality of positions along the length of the oblong configuration.

Due to the specific configuration of the funnel, which has been made by bending or curving the portions of the legs between slits 29 to form the Y-shaped structure, the expanding member follows a straight path, and does not tend to deviate as it tends to do in the case of the funnel configuration shown in FIG. 1A, and as disclosed in provisional patent application No. 60/171,544, filed on Dec. 22, 1999 and patent application Ser. No. 09/611,134, filed Jul. 6, 2000.

Figure 5:
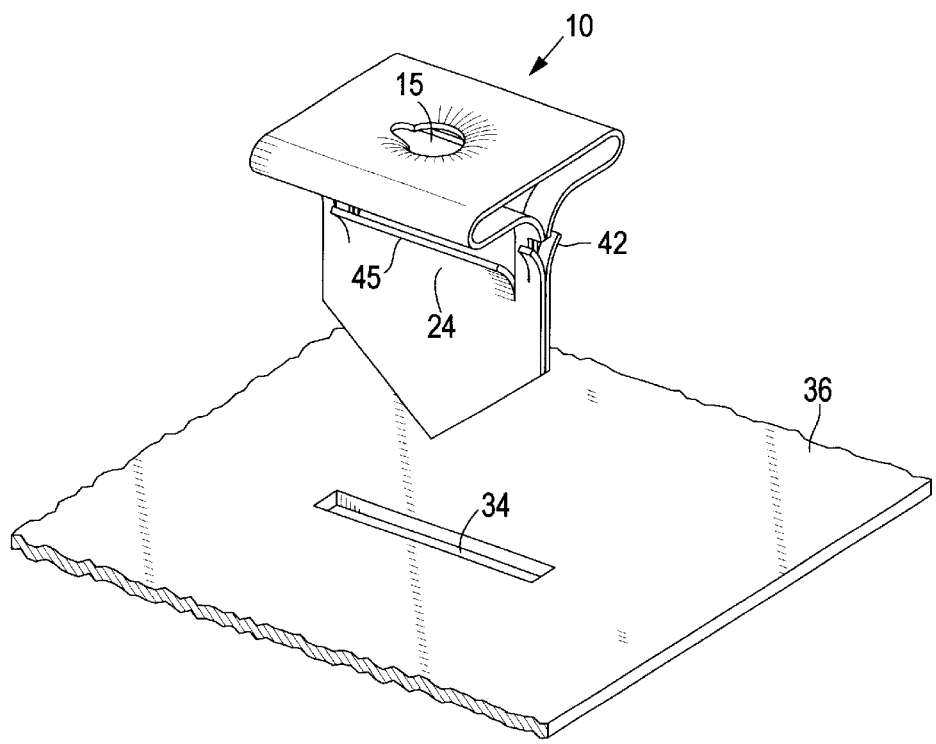
FIG. 5 is a perspective view of a fastener according to another preferred embodiment of this invention, wherein the hole on the upper side of the head has a substantially round shape, and a panel with a slot, on which panel the fastener is intended to fasten another object.
Figure 6:
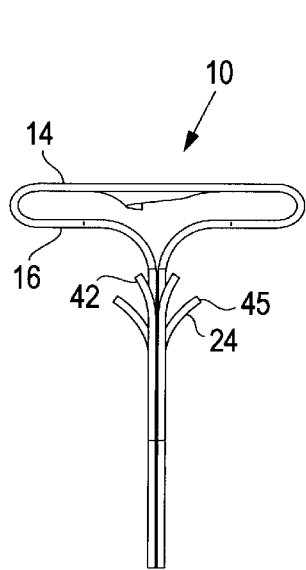
FIG. 6 is a side view of the fastener illustrated in FIG. 5.
Figure 7:
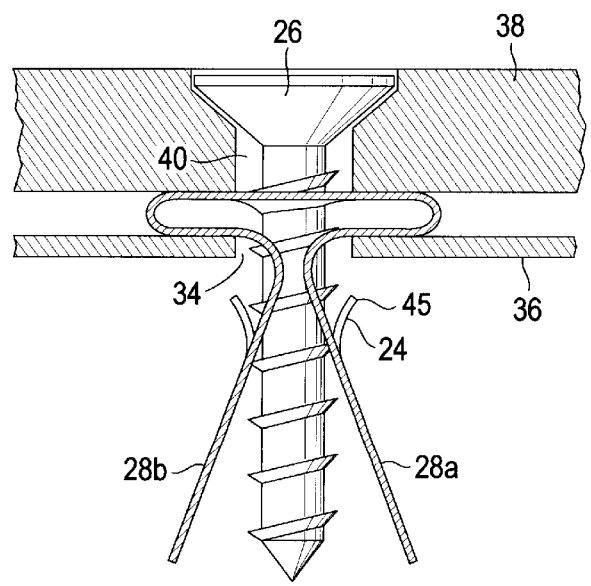
FIG. 7 is a cross-sectional side view of the fastener illustrated in FIGS. 5 and 6 Connecting two objects or panels after the legs of the fastener have been expanded by a screw.

In other embodiments of the invention, the hole may be round, as shown in FIGS. 5–7, or have any other desirable shape, depending on the particular application. The hole 15 may also be an non-engageable hole, especially in the case wherein there is at least one engageable region of the fastener under the upper side 14 of the head 12.

Since it is highly desirable for the fastener to be secured on sheet 36 after the fastener has been inserted into the slot 34, barbs 42 are also incorporated onto the neck 20 of the fastener 10, so that they can engage under the sheet 36 after the insertion and support the fastener.

The operation of such embodiments is the same as in the previous embodiment for all practical purposes.

Figure 8:
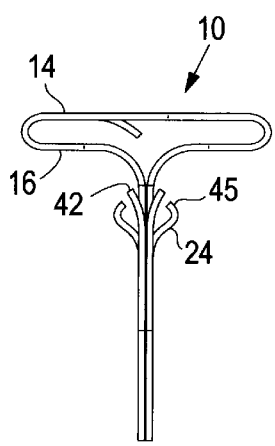
FIG. 8 is a side view of the fastener according to another preferred embodiment of the instant invention, wherein the upper extensions of the Y-shaped funnel are inwardly bent.
Figure 9:
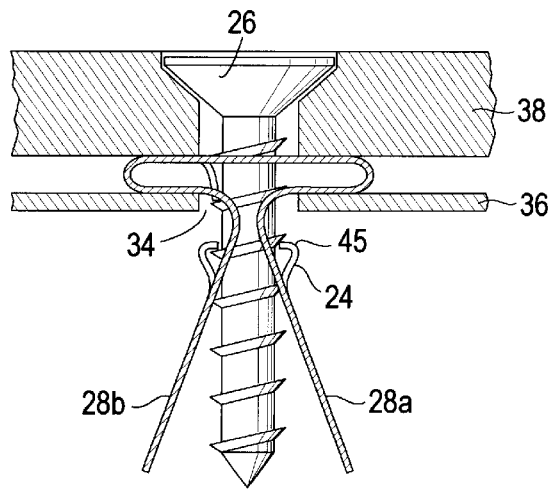
FIG. 9 is a cross-sectional side view of the fastener illustrated in FIG. 8, connecting two objects or panels after the legs of the fastener have been expanded by a screw.

In a different embodiment, better shown in FIGS. 8 and 9, the upper portion 45 of the Y-shaped funnel is inwardly bent.

The operation of this embodiment is similar to the operation of the other embodiments, with the difference that when the expanding body, such as the screw 26, is inserted into the hole of the fastener 10, said upper portion 45 of the Y-shaped funnel engages on the screw.

Figure 10:
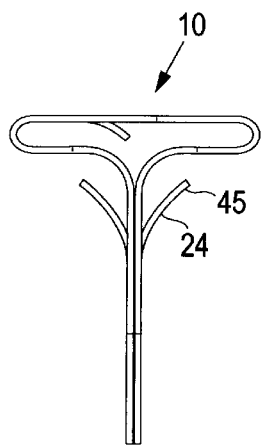
FIG. 10 is a side view of the fastener according to another preferred embodiment of the instant invention, wherein the upper extensions of the Y-shaped funnel have been designed to support the fastener on one of the objects to be connected together by said fastener, and replace barbs.
Figure 11:
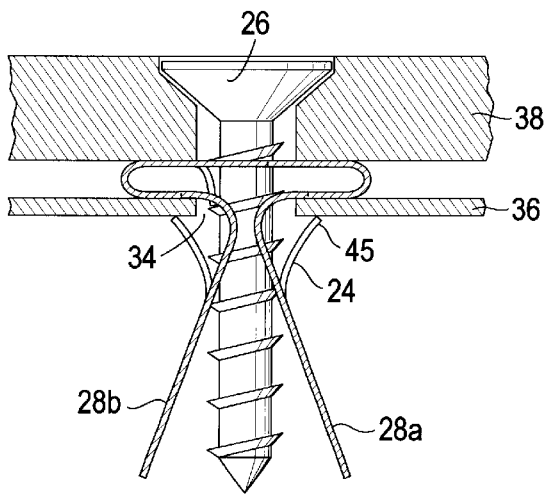
FIG. 11 is a cross-sectional side view of the fastener illustrated in FIG. 10, connecting two objects or panels after the legs of the fastener have been expanded by a screw.

In still a different embodiment, better shown in FIGS. 10 and 11, the upper portion 45 of the Y-shaped funnel is adequately long to engage under the sheet 36, thus eliminating the need for barbs.

The operation of this embodiment is similar to the operation of the other embodiments, with the difference the upper portion 45 of the Y-shaped funnel engages under the sheet 36 upon insertion of the expanding member 26.

Figure 12:
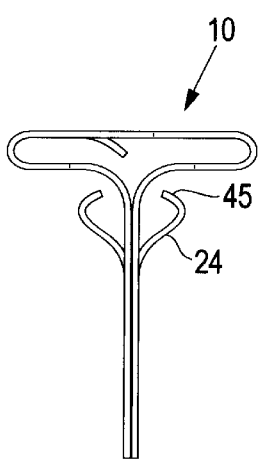
FIG. 12 is a side view of the fastener according to another preferred embodiment of the instant invention, wherein the upper extensions of the Y-shaped funnel have been designed to support the fastener on one of the objects to be connected together by said fastener, and replace barbs, and further, said extensions are bent in a manner to offer additional engagement under the head.
Figure 13:
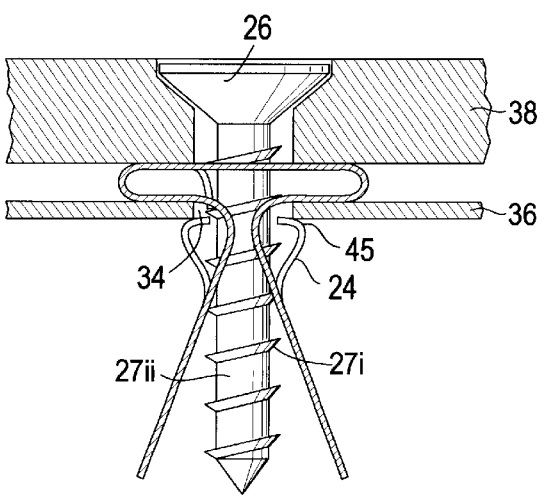
FIG. 13 is a cross-sectional side view of the fastener illustrated in FIG. 12, connecting two objects or panels after the legs of the fastener have been expanded by a screw.

In still a different embodiment, better shown in FIGS. 12 and 13, the upper portion 45 of the Y-shaped funnel is adequately long to engage under the sheet 36 and at the same time inwardly bent to engage on the screw upon insertion of the expanding body, such as screw 26.

The operation of this embodiment is substantially the same as the operation of the other embodiments, with the difference that the upper portion 45 of the Y-shaped funnel engages both under the sheet 36 and on the screw 26, thus eliminating the need for barbs, and at the same time providing an engagement.

Since the width of the Y-shaped funnel is considerably longer than the width of the barbs, the attachment strength it provides between the fastener 10 and the sheet 36 is considerably greater that the attachment strength that the barbs can provide.

Further, the bent upper portions 45 provide a strong engagement in holding the screw 26 attached to the fastener 10.

The length of the upper portion 45 corresponding to the right leg 28b of the fastener 10 may be different than the length corresponding to the left leg 28b. Preferably the difference corresponds to the pitch of the screw.

The upper portions 45, may also comprise partial holes commensurate to the root of the screw.

It should be noted that the embodiment shown in FIGS. 12 and 13 provides considerably stronger engagement of the fastener 10 to the screw 26 as compared to the embodiment depicted in FIGS. 8 and 9.

Especially in the case that the engageable hole 15 is generally round, as shown in FIG. 5 for example, the cut funnel 24 may have preferably in the vicinity of its convergence with the legs, a secondary funnel impression, substantially coaxial with the engageable hole 15, for better guidance of the screw or other expanding member. A multiplicity of such impressions may be used in the case that the engageable hole 15 is oblong, as shown for example in case of FIG. 1.

It is evident that the embodiments of the above applications may have to be adjusted to fit the requirements of the instant invention.

The embodiments described hereinabove serve illustration purposes only regarding this invention, which should only be bound by the claims.

Any explanations given are speculative and should not restrict the scope of the claims.

What is claimed is:

1. A spring fastener comprising:
   (a) a substantially flat head portion having an upper side, and a lower side, the upper side having a hole through which an expanding member can pass;
   (b) a neck having an opening and two side neck portions, the neck extending from the lower side of the substantially flat head portion at a substantially right angle with respect to the substantially flat head portion;
   (c) two substantially flat legs extending from the neck, each leg having an inner surface, the two inner surfaces of the two legs being at an initial proximity with each other, the legs being expandable in opposite directions upon inserting through and engaging to the first oblong engageable hole an expanding member, thus bringing the expanding member to a contact region of the legs; and
   (d) a Y-shaped funnel in the vicinity of the contact region, the Y-shaped funnel comprising partially cut leg portions extending outwardly from the legs.

2. A fastener as defined in claim 1, wherein the hole is substantially round having a diameter, and wherein the funnel has a first width longer than the diameter of the hole.

3. A fastener as defined in claim 1, wherein the hole is engageable to the expanding member.

4. A fastener as defined in claim 2, wherein the hole is engageable to the expanding member.

5. A fastener as defined in claim 1, wherein the hole comprises an oblong opening having a second width, the second width being at least as long as the first width.

6. A fastener as defined in claim 3, wherein the hole comprises an oblong opening having a second width, the second width being at least as long as the first width.

7. A fastener as defined in claim 6, wherein the hole has a first a first side and a second side opposite the first side, the first side being disposed at a first plane and the second side disposed at a second plane different than the first plane, the first side having a first edge and the second side having a second edge.

8. A fastener as defined in claim 7, wherein the expanding member has threads, a root, and a pitch, and the first edge and the second edge are separated by a distance corresponding to the pitch of the expanding member.

9. A fastener as defined in claim 8, wherein at least one of the first edge and the second edge is linear.

10. A fastener as defined in claim 8, wherein at least one of the first edge and the second edge is curved.

11. A fastener as defined in claim 1, wherein a portion of the fastener under the upper side of the head comprises an engageable element to the expanding member.

12. A fastener as defined in claim 3, wherein a portion of the fastener under the upper side of the head comprises an engageable element to the expanding member.

13. A fastener as defined in claim 4, wherein a portion of the fastener under the upper side of the head comprises an engageable element to the expanding member.

14. A fastener as defined in claim 5, wherein a portion of the fastener under the upper side of the head comprises an engageable element to the expanding member.

15. A fastener as defined in claim 1, further comprising an elastic body molded at least at the lower side of the head of the fastener.

16. A fastener as defined in claim 3, further comprising an elastic body molded at least at the lower side of the head of the fastener.

17. A fastener as defined in claim 4, further comprising an elastic body molded at least at the lower side of the head of the fastener.

18. A fastener as defined in claim 5, further comprising an elastic body molded at least at the lower side of the head of the fastener.

19. A fastener as defined in claim 11, further comprising an elastic body molded at least at the lower side of the head of the fastener.

20. A fastener as defined in claim 12, further comprising an elastic body molded at least at the lower side of the head of the fastener.

21. A fastener as defined in claim 13, further comprising an elastic body molded at least at the lower side of the head of the fastener.

22. A fastener as defined in claim 14, further comprising an elastic body molded at least at the lower side of the head of the fastener.

23. A fastener as defined in claim 1, wherein the Y-shaped funnel comprises an inwardly bent upper portion.

24. A fastener as defined in claim 2, wherein the Y-shaped funnel comprises an inwardly bent upper portion.

25. A fastener as defined in claim 3, wherein the Y-shaped funnel comprises an inwardly bent upper portion.

26. A fastener as defined in claim 4, wherein the Y-shaped funnel comprises an inwardly bent upper portion.

27. A fastener as defined in claim 1, wherein the Y-shaped funnel is adequately long to engage under a specified panel, through a slot of which panel the spring fastener has been inserted and the legs of said fastener have been expanded by the expanding member.

28. A fastener as defined in claim 2, wherein the Y-shaped funnel is adequately long to engage under a specified panel, through a slot of which panel the spring fastener has been inserted and the legs of said fastener have been expanded by the expanding member.

29. A fastener as defined in claim 3, wherein the Y-shaped funnel is adequately long to engage under a specified panel, through a slot of which panel the spring fastener has been inserted and the legs of said fastener have been expanded by the expanding member.

30. A fastener as defined in claim 4, wherein the Y-shaped funnel is adequately long to engage under a specified panel, through a slot of which panel the spring fastener has been inserted and the legs of said fastener have been expanded by the expanding member.

31. A fastener as defined in claim 1, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

32. A fastener as defined in claim 2, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

33. A fastener as defined in claim 3, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

34. A fastener as defined in claim 4, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

35. A vehicle comprising two parts connected with a spring fastener, the spring fastener comprising:
(a) a substantially flat head portion having an upper side, and a lower side, the upper side having a hole through which an expanding member can pass;
(b) a neck having an opening and two side neck portions, the neck extending from the lower side of the substantially flat head portion at a substantially right angle with respect to the substantially flat head portion;
(c) two substantially flat legs extending from the neck, each leg having an inner surface, the two inner surfaces of the two legs being at an initial proximity with each other, the legs being expandable in opposite directions upon inserting through and engaging to the first oblong engageable hole an expanding member, thus bringing the expanding member to a contact region of the legs; and
(d) a Y-shaped funnel in the vicinity of the contact region, the Y-shaped funnel comprising partially cut leg portions extending outwardly from the legs.

36. A vehicle as defined in claim 35, wherein the hole is substantially round having a diameter, and wherein the funnel has a first width longer than the diameter of the hole.

37. A vehicle as defined in claim 35, wherein the hole is engageable to the expanding member.

38. A vehicle as defined in claim 36, wherein the hole is engageable to the expanding member.

39. A vehicle as defined in claim 35, wherein the hole comprises an oblong opening having a second width, the second width being at least as long as the first width.

40. A vehicle as defined in claim 34, wherein the hole comprises an oblong opening having a second width, the second width being at least as long as the first width.

41. A vehicle as defined in claim 40, wherein the hole has a first a first side and a second side opposite the first side, the first side being disposed at a first plane and the second side disposed at a second plane different than the first plane, the first side having a first edge and the second side having a second edge.

42. A vehicle as defined in claim 41, wherein the expanding member has threads, a root, and a pitch, and the first edge and the second edge are separated by a distance corresponding to the pitch of the expanding member.

43. A vehicle as defined in claim 42, wherein at least one of the first edge and the second edge is linear.

44. A vehicle as defined in claim 42, wherein at least one of the first edge and the second edge is curved.

45. A vehicle as defined in claim 35, wherein a portion of the fastener under the upper side of the head comprises an engageable element to the expanding member.

46. A vehicle as defined in claim 37, wherein a portion of the fastener under the upper side of the head comprises an engageable element to the expanding member.

47. A vehicle as defined in claim 38, wherein a portion of the fastener under the upper side of the head comprises an engageable element to the expanding member.

48. A vehicle as defined in claim 39, wherein a portion of the fastener under the upper side of the head comprises an engageable element to the expanding member.

49. A vehicle as defined in claim 35, wherein the spring fastener further comprises an elastic body molded at least at the lower side of the head of the fastener.

50. A vehicle as defined in claim 37, wherein the spring fastener further comprises an elastic body molded at least at the lower side of the head of the fastener.

51. A vehicle as defined in claim 38, wherein the spring fastener further comprises an elastic body molded at least at the lower side of the head of the fastener.

52. A vehicle as defined in claim 39, wherein the spring fastener further comprises an elastic body molded at least at the lower side of the head of the fastener.

53. A vehicle as defined in claim 45, wherein the spring fastener further comprises an elastic body molded at least at the lower side of the head of the fastener.

54. A vehicle as defined in claim 46, wherein the spring fastener further comprises an elastic body molded at least at the lower side of the head of the fastener.

55. A vehicle as defined in claim 47, wherein the spring fastener further comprises an elastic body molded at least at the lower side of the head of the fastener.

56. A vehicle as defined in claim 48, wherein the spring fastener further comprises an elastic body molded at least at the lower side of the head of the fastener.

57. A vehicle as defined in claim 35, wherein the Y-shaped funnel comprises an inwardly bent upper portion.

58. A vehicle as defined in claim 36, wherein the Y-shaped funnel comprises an inwardly bent upper portion.

59. A vehicle as defined in claim 37, wherein the Y-shaped funnel comprises an inwardly bent upper portion.

60. A vehicle as defined in claim 38, wherein the Y-shaped funnel comprises an inwardly bent upper portion.

61. A vehicle as defined in claim 35, wherein the Y-shaped funnel is adequately long to engage under a specified panel, through a slot of which panel the spring fastener has been inserted and the legs of said fastener have been expanded by the expanding member.

62. A vehicle as defined in claim 36, wherein the Y-shaped funnel is adequately long to engage under a specified panel, through a slot of which panel the spring fastener has been inserted and the legs of said fastener have been expanded by the expanding member.

63. A vehicle as defined in claim 37, wherein the Y-shaped funnel is adequately long to engage under a specified panel, through a slot of which panel the spring fastener has been inserted and the legs of said fastener have been expanded by the expanding member.

64. A vehicle as defined in claim 38, wherein the Y-shaped funnel is adequately long to engage under a specified panel, through a slot of which panel the spring fastener has been inserted and the legs of said fastener have been expanded by the expanding member.

65. A vehicle as defined in claim 35, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

66. A vehicle as defined in claim 36, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

67. A vehicle as defined in claim 37, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

68. A vehicle as defined in claim 38, wherein the Y-shaped funnel comprises an inwardly bent upper portion, and wherein said Y-shaped funnel is adequately long to engage under a specified panel, through a slot of which panel the spring fastener has been inserted and the legs of said fastener have been expanded by the expanding member.

* * * * *